United States Patent Office 3,751,426
Patented Aug. 7, 1973

3,751,426
1-SUBSTITUTED-6-PHENYL-4H-s-TRIAZOLO[4,3-a]
[1,6]BENZODIAZEPINE COMPOUNDS
Jackson B. Hester, Jr., Galesburg, Mich., assignor to The
Upjohn Company, Kalamazoo, Mich.
No Drawing. Filed Apr. 28, 1971, Ser. No. 138,290
Int. Cl. C07d 57/02
U.S. Cl. 260—308 R        18 Claims

ABSTRACT OF THE DISCLOSURE

1 - substituted - 6 - phenyl-4H-s-triazolo[4,3-a][1,4] benzodiazepines of the Formula VII:

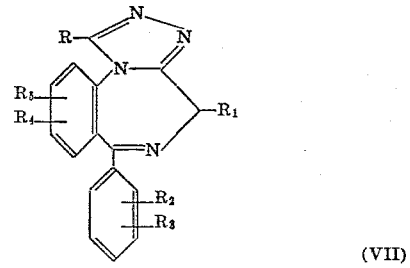

(VII)

wherein R is selected from the group consisting of thio, alkylthio, in which the alkyl group is of 1 to 3 carbon atoms, inclusive, amino, nitro, and fluoro; wherein $R_1$ is selected from the group consisting of hydrogen and alkyl of 1 to 3 carbon atoms, inclusive; and wherein $R_2$, $R_3$, $R_4$, and $R_5$ are selected from the group consisting of hydrogen, alkyl as defined above, halogen, nitro, cyano, trifluoromethyl, and alkoxy, alkylthio, alkylsulfinyl and alkylsulfonyl, in which the carbon chain moieties are of 1 to 3 carbon atoms, inclusive, are produced by condensing a 5-phenyl-3H-1,4-benzodiazepin-2-yl hydrazine of the Formula I:

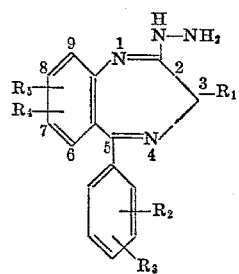

with thiophosgene ($SCCl_2$) to obtain a triazole of Formula VII above in which R is a thio group, or treating I with cyanogen bromide (BrCN) to give a compound of Formula VII wherein R is the amino group. Further conventional treatments produces the compounds in which R is an alkylthio or nitro group or fluoro.

The new products of Formula VII including their pharmacologically acceptable acid addition salts are useful as sedatives, tranquilizers and muscle relaxants in mammals and birds.

BACKGROUND OF THE INVENTION

Field of the invention

This invention is directed to new organic compounds and is particularly concerned with novel 1-substituted-6-phenyl-4H-s-triazolo[4,3-a][1,4]benzodiazepines and a process for the production thereof. The 1-substituent herein is selected from thio, lower-alkylthio, amino, nitro, and fluoro.

The novel compounds and the process of production therefor can be illustratively represented as follows:

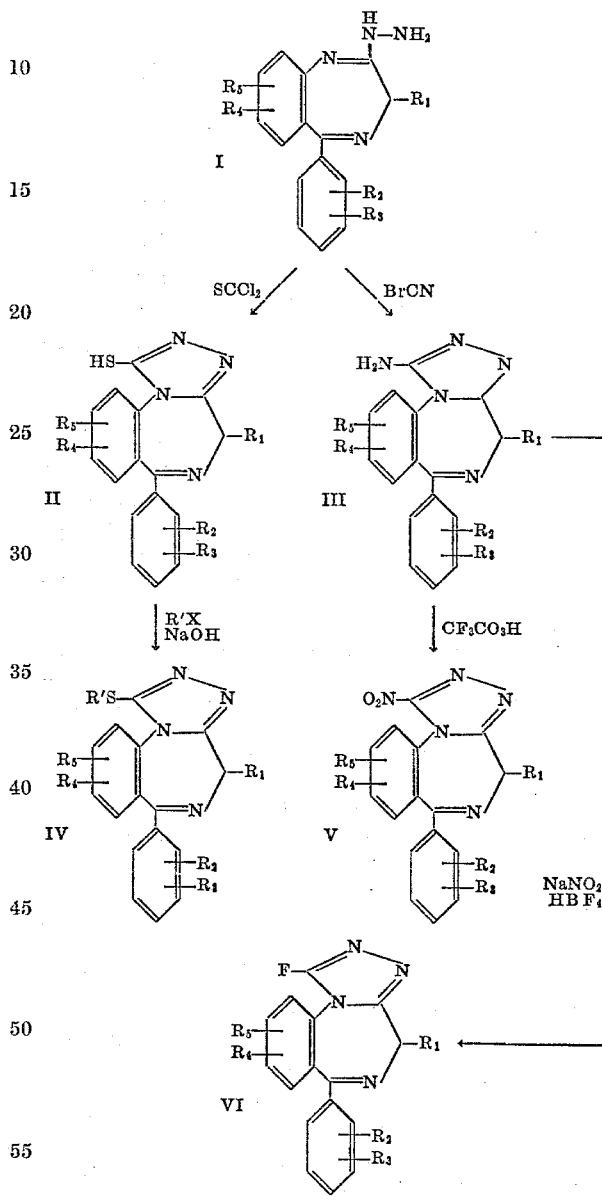

wherein R' is alkyl of 1 to 3 carbon atoms, inclusive; wherein $R_1$ is selected from the group consisting of hydrogen and alkyl as defined above; and wherein $R_2$, $R_3$, $R_4$, and $R_5$ are selected from the group consisting of hydrogen, alkyl defined as above, halogen, nitro, cyano, trifluoromethyl, and alkoxy, alkylthio, alkylsulfinyl and alkylsulfonyl, in which the carbon chain moieties are of 1 to 3 carbon atoms, inclusive.

The new compounds II, III, IV, V, and VI can be summarily illustrated by the Formula VII:

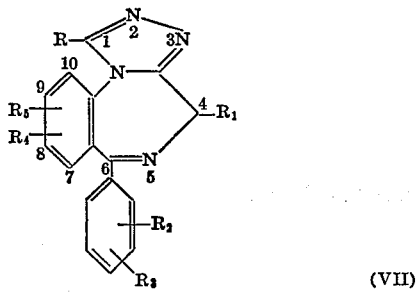

wherein R is selected from the group consisting of thio, alkylthio, wherein the alkyl group is of 1 to 3 carbon atoms, inclusive, amino, nitro, and fluoro; wherein $R_1$ is selected from the group consisting of hydrogen and alkyl, as defined above; and wherein $R_2$, $R_3$, $R_4$, and $R_5$ are selected from the group consisting of hydrogen, alkyl as defined above, halogen, nitro, cyano, trifluoromethyl, and alkoxy, alkylthio, alkylsulfinyl, and alkylsulfonyl, in which the carbon chain moieties are of 1 to 3 carbon atoms, inclusive.

The process of this invention comprises: treating a 5-phenyl-3H-1,4-benzodiazepine-2-yl hydrazine I with an organic base and thiophosgene at —20 to 10° C. and then heating the mixture from room temperature to 100° C. for completion of the reaction, to give the corresponding Compound II.

Compound II with sodium or potassium hydroxide and an alkyl halide

R'X wherein R' is alkyl of 1 to 3 carbon atoms, inclusive, and X is chlorine, bromine or iodine, gives Compound IV.

On the other hand, treating Compound I at —10 to +10° C. with sodium or potassium carbonate and thereafter with cyanogen bromide, warming the mixture finally to 25–50° C. gives the corresponding 1-amino-6-phenyl-4H-s-triazolo[4,3-a][1,4]benzodiazepine III.

Compound III when oxidized with peroxytrifluoroacetic acid in an inert organic solvent at between 0 to 50° C. gives the nitro-Compound V. Compound III with fluoroboric acid and sodium nitrite in aqueous solution at 0 to 3° C. gives the diazonium fluoroborate which by heating decomposes to give the Compound VI.

DESCRIPTION OF THE PREFERRED EMBODIMENT

Lower alkyl groups of 1 to 3 carbon atoms, inclusive, are exemplified by methyl, ethyl, propyl, and isopropyl.

The carbon chain moiety of alkoxy, alkylthio, alkylsulfinyl, alkylsulfonyl, is alkyl of 1 to 3 carbon atoms, inclusive, defined as above.

The term halogen includes fluorine, chlorine, bromine, and iodine.

The novel compounds of the Formula VII including acid addition salts thereof have sedative, tranquilizing and muscle relaxant effects in mammals and birds.

The acid addition salts of compounds of Formula VII contemplated in this invention, are the hydrochlorides, hydrobromides, hydroiodides, sulfates, phosphates, cyclohexanesulfamates, methanesulfonates, and the like, prepared by reacting a compound of Formula VII with an excess of the selected pharmacologically acceptable acid.

Sedative effects of 8-chloro-6-phenyl-4H-s-triazolo-[4,3-a][1,4]benzodiazepine-1-thiol are shown by the following tests in mice:

Chimney test: [Med. Exp. 4, 11 (1961)]: The effective intraperitoneal dosage for 50% of the mice ($ED_{50}$) is 5.0 mg./kg. for 8-chloro-6-phenyl-4H-s-triazolo[4,3-a]-[1,4]benzodiazepine-1-thiol. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 2.2 mg./kg. for 8-chloro - 6 - phenyl - 4H - s-triazolo[4,3-a][1,4]benzodiazepine-1-thiol.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) for 8-chloro-6-phenyl-4H-s-triazolo[4,3-a][1,4]benzodiazepine-1-thiol is 4 mg./kg.

Nicotine antagonism test: Mice in a group of 6 are injected with the test compound (8-chloro-6-phenyl-4H-s-triazolo[4,3-a][1,4]benzodiazepine-1-thiol). Thirty minutes later the mice, including control (untreated) mice, are injected with nicotine salicylate (2 mg./kg.). The control mice show overstimulation, i.e., (1) running convulsions followed by (2) tonic extensor fits; followed by (3) death. An intraperitoneal dosage of 0.8 mg./kg. of the test compound protected 50% of the mice against (2) and (3).

Antagonism to strychnine (as sulfate: The effective dosage ($ED_{50}$), of 8-chloro-6-phenyl-4H-s-triazolo[4,3-a] [1,4]benzodiazepine-1-thiol is 14 mg./kg. orally in mice. The test consists in orally administering into groups of 6 mice the test compound, 8-chloro-6-phenyl-4H-s-triazolo[4,3-a][1,4]benzodiazepine-1-thiol and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The following compounds have (by intraperitoneal injection) and $ED_{50}$ as shown in the table below:

| Compound | $ED_{50}$ (in mg./kg.) | | | |
|---|---|---|---|---|
| | Ch | D | P | Ni |
| 8-chloro-1-(methylthio)-6-phenyl-4H-s-triazolo[4,3-a][1,4]benzodiazepine | 2.5 | 18 | 18 | 1.4 |
| 8-chloro-1-amino-6-phenyl-4H-s-triazolo-[4,3-a][1,4]benzodiazepine | 36 | 4.5 | 18 | 2 |

NOTE.—Ch=chimney test; D=dish test; P=pedestal test; Ni=nicotine antagonism (3) test.

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil, may be used for preparing solutions or suspensions of the active drug. Sweetening, coloring and flavoring agents may be added.

For mammals and birds, food premixes, with starch, oatmeal, dried fishmeat, fishmeal, flour and the like can be prepared.

As tranquilizers the compounds of Formula VII can be used in dosages of 1 mg. to 50 mg./kg. in oral or injectable preparations as described above, to alleviate tension and anxiety in mammals, or birds, such as e.g., occurs when animals are in travel.

Other acid addition salts of the compounds of Formula VII can be made such as the fluosilicic acid addition salts which are useful mothproofing compounds or the trichloroacetates useful as herbicides against Johnson grass, Bermuda grass, yellow foxtail and green foxtail, and quack grass.

The starting materials of Formula I of this invention, are prepared as shown in Preparation 1.

In carrying out the process of this invention a selected 5-phenyl-3H-1,4-benzodiazepin-2-yl hydrazine (I), in an inert organic solvent, and with an organic base, is treated with thiophosgene. Suitable inert organic solvents are toluene, ethylbenzene, xylenes, dioxane, tetrahydrofuran, dipropyl ether, and the like. The addition is preferably carried out between —20 to 5° C., and the mixture is then heated to 25–100°, generally when in tetrahydrofuran to the reflux temperature of the mixture, during 1 to 8 hours. The product a 6-phenyl-4H-s-triazolo[4,3-a][1,4]-benzodiazepine-1-thiol (II) is recovered by conventional procedures, e.g. extraction, evaporation, crystallization, chromatography and the like.

Compound II is converted to the alkyl derivative IV, a 1 - alkylthio - 6-phenyl-4H-s-triazolo[4,3-a][1,4]benzodiazepine by treating an aqueous alkaline hydroxide suspension of II with an alkyl halide R′X. (R′ is alkyl of 1 to 3 carbon atoms, X is chlorine, bromine, or preferably iodine). In the preferred embodiment of this invention, the reaction is carried out between 20–50° C. and for a period of 15 to 60 minutes. The product is isolated and purified by conventional procedures e.g. extraction, evaporation, crystallization, chromatography, and the like.

Alternatively, Compound I can be converted to Compound III, a 1-amino-6-phenyl-4H-s-triazolo[4,3-a][1,4]-benzodiazepine, by treating an aqueous sodium bicarbonate and a dioxane solution of 1, first cooled, with cyanogen bromide in a water-miscible, inert, organic solvent such as dioxane or tetrahydrofuran. During the adding of the cyanogen bromide the mixture is kept at 0–5° C.; thereafter the mixture is warmed up to 25–50° C. and kept for 1 to 5 hours at this temperature. The product is isolated and purified by conventional procedures, e.g. extraction, crystallization, chromatography, and the like.

Compound III can be converted to the nitro Compound V by oxidizing III with peroxytrifluoroacetic acid in an inert organic solvent such as methylene chloride, chloroform, ethylene chloride, benzene or the like. The addition of the peracid is carried out at 10–60° C. and the mixture is then allowed to reflux from 30 minutes to 4 hours. The product is isolated and purified by conventional procedures, i.e. extraction, chromatography, crystallization and the like.

Compound III can be furthermore converted to Compound VI, a 1-fluoro-6-phenyl-4H-s-triazolo[4,3-a][1,4]-benzodiazepine. This conversion involves: dissolving Compound III in fluoboric acid, treating the solution with sodium nitrite in the cold (0–10° C.) then warming the mixture to a temperature of 30–45° C. to decompose the intermediate diazonium compound. The desired product VI is isolated and purified by conventional procedures e.g. neutralization of the reaction mixture, extraction, chromatography, crystallization, and the like.

The following preparations and examples are illustrative of the process and products of the precent invention, but are not to be construed as limiting.

Preparation 1

7-chloro-5-phenyl-3H-1,4-benzodiazepin-2-yl hydrazine

A stirred mixture of 7-chloro-1,3-dihydro-5-phenyl-2H-1,4 - benzodiazepine - 2-thione (50 g., 0.174 mole) and methanol (1700 ml.) was treated with hydrazine hydrate (34.9 g.) and allowed to remain at ambient temperature for 1 hour 45 minutes. A slow stream of nitrogen was bubbled through the mixture during this period. The resulting solution was concentrated in vacuo at 25–30° C. The thus obtained residue was mixed with water and extracted with chloroform. The extract was dried over anhydrous potassium carbonate and concentrated under reduced pressure on the rotary evaporator in such a manner that the chloroform was replaced by ethyl acetate. The resulting mixture was crystallized at 4° C. to give 26.6 g. of 7-chloro-5-phenyl-3H-1,4-benzodiazepin-2-yl hydrazine of melting point 184–186° C. and 3.05 g. of melting point 204–211 C°. (60%). This compound decomposes on heating in solvents to an unknown product, melting point 261–262° C. The analytical sample was crystallized from ethyl acetate and had a melting point 217.5–219° C.

Analysis.—Calcd. for $C_{15}H_{13}ClN_4$ (percent): C, 63.27; H, 4.60; Cl, 12.45; N, 19.68. Found (percent): C, 63.30; H, 4.52; Cl, 12.46; N, 18.86.

The starting thiones of this invention, substituted or unsubstituted 1,3 - dihydro - 5-phenyl-2H-1,4-benzodiazepine-2-thiones, are described by G. A. Archer and L. H. Sternbach [J. Org. Chem. 29, 231 (1964) and U.S. Pat. 3,422,091]. These compounds are made by the reaction of the known substituted or unsubstituted 1,3-dihydro-5-phenyl-2H-1,4-benzodiazepin-2-ones by heating with phosphorus pentasulfide in pyridine for about 45 minutes (Archer et al., ibid.).

Likewise as in Preparation 1, other hydrazine compounds of Formula I are prepared by treating at about room temperature a 1,3-dihydro-5-phenyl-2H-1,4-benzodiazepine-2-thione with hydrazine hydrate in methanol or ethanol. Representative 5-phenyl-3H-1,4-benzodiazepin-2-yl hydrazines (I), thus obtained, include:

5-phenyl-3H-1,4-benzodiazepin-2-yl hydrazine;
6-chloro-5-(m-bromophenyl)-3H-1,4-benzodiazepin-2-yl hydrazine;
7-chloro-5-(o-fluorophenyl)-3H-1,4-benzodiazepin-2-yl hydrazine;
8-chloro-5-phenyl-3H-1,4-benzodiazepin-2-yl hydrazine;
7-bromo-5-phenyl-3H-1,4-benzodiazepin-2-yl hydrazine;
7-chloro-5-(3,4-dimethylphenyl)-3H-1,4-benzodiazepin-2-yl hydrazine;
5-(2-methyl-5-methoxyphenyl)-3H-1,4-benzodiazepin-2-yl hydrazine;
9-bromo-5-phenyl-3H-1,4-benzodiazepin-2-yl hydrazine;
7-methyl-5-phenyl-3H-1,4-benzodiazepin-2-yl hydrazine;
7-nitro-5-phenyl-3H-1,4-benzodiazepin-2-yl hydrazine;
7-fluoro-5-phenyl-3H-1,4-benzodiazepin-2-yl hydrazine;
7-trifluoromethyl-5-phenyl-3H-1,4-benzodiazepin-2-yl hydrazine;
9-trifluoromethyl-5-(o-nitrophenyl)-3H-1,4-benzodiazepin-2-yl hydrazine;
7-cyano-5-phenyl-3H-1,4-benzodiazepin-2-yl hydrazine;
8-cyano-5-[p-trifluoromethyl)phenyl]-3H-1,4-benzodiazepin-2-yl hydrazine;
7-chloro-5-(o-chlorophenyl)-3H-1,4-benzodiazepin-2-yl hydrazine;
6-ethylthio-5-(o-bromophenyl)-3H-1,4-benzodiazepin-2-yl hydrazine;
6,8-dichloro-5-(o-fluorophenyl)-3H-1,4-benzodiazepin-2-yl hydrazine;
8-propoxy-7-bromo-5-[m-(ethylsulfinyl)phenyl]-3H-1,4-benzodiazepin-2-yl hydrazine;
9-nitro-7-methyl-5-[m-(propylsulfonyl)phenyl]-3H-1,4-benzodiazepin-2-yl hydrazine;
7-bromo-5-(o-fluorophenyl)-3H-1,4-benzodiazepin-2-yl hydrazine;
3-methyl-5-(o-fluorophenyl)-3H-1,4-benzodiazepin-2-yl hydrazine;
7-fluoro-5-(o-fluorophenyl)-3H-1,4-benzodiazepin-2-yl hydrazine;
3-methyl-5-(p-fluorophenyl)-3H-1,4-benzodiazepin-2-yl hydrazine;
7-nitro-5-(o-chlorophenyl)-3H-1,4-benzodiazepin-2-yl hydrazine;
8-nitro-5-(o-chlorophenyl)-3H-1,4-benzodiazepin-2-yl hydrazine;
7-bromo-5-(o-bromophenyl)-3H-1,4-benzodiazepin-2-yl hydrazine;
7-methylsulfinyl-5-(o-fluorophenyl)-3H-1,4-benzodiazepin-2-yl hydrazine;

7-methyl-5-(o-chlorophenyl)-3H-1,4-benzodiazepin-2-yl hydrazine;
7-methylthio-5-phenyl-3H-1,4-benzodiazepin-2-yl hydrazine;
7-cyano-5-(o-chlorophenyl)-3H-1,4-benzodiazepin-2-yl hydrazine;
3,6,8-trimethyl-5-(o-chlorophenyl)-3H-1,4-benzodiazepin-2-yl hydrazine;
9-propylsulfonyl-7-methyl-5-phenyl-3H-1,4-benzodiazepin-2-yl hydrazine;
7-trifluoromethyl-5-(o-chlorophenyl)-3H-1,4-benzodiazepin-2-yl hydrazine;
7-fluoro-5-(p-ethoxyphenyl)-3H-1,4-benzodiazepin-2-yl hydrazine;
7-fluoro-5-(o-methylphenyl)-3H-1,4-benzodiazepin-2-yl hydrazine;
7,8-dicyano-5-[p-(methylsulfonyl)phenyl]-3H-1,4-benzodiazepin-2-yl hydrazine;
6,9-dichloro-5-(p-isopropylphenyl)-3H-1,4-benzodiazepin-2-yl hydrazine;
6,8-diethyl-5-(methylphenyl-3H-1,4-benzodiazepin-2-yl hydrazine;
6-nitro-5-(o-cyanophenyl)-3H-1,4-benzodiazepin-2-yl hydrazine;
and the like.

EXAMPLE 1

8-chloro-6-phenyl-4H-s-triazolo[4,3-a][1,4]benzodiazepin-1-thiol

A solution of 7-chloro-5-phenyl-3H-1,4-benzodiazepin-2-yl hydrazine (2.85 g., 0.01 mole) and triethylamine (3.05 ml. 0.022 mole) in dry tetrahydrofuran (40 ml.) was cooled in a salt-ice bath and treated during 25 minutes with a solution of thiophosgene ($SCCl_2$) (0.838 ml., 0.011 mole) in tetrahydrofuran. The mixture was kept at ambient temperature for 17 hours, refluxed for 1 hour and concentrated in vacuo. The residue was suspended in water, neutralized with sodium bicarbonate and extracted with chloroform. The extract was washed with water, dried over anhydrous magnesium sulfate and concentrated. The residue was chromatographed on silica gel (150 g.) with 1% methanol-99% chloroform. The product obtained from the column was dissolved in ethyl acetate, decolorized with Darco G60 (activated charcoal) and crystallized to give: 0.698 g., melting point 239.5–240.5° C.; 0.097 g., melting point 239–240° and 0.291 g., melting point 237–239° C. of 8-chloro-6-phenyl-4H-s-triazolo[4,3-a][1,4]benzodiazepine-1-thiol. The analytical sample had melting point 240.5–241.5° C.

Analysis.—Calcd. for $C_{16}H_{11}ClN_4S$ (percent): C, 58.80; H, 3.39; Cl, 10.85; N, 17.14; S, 9.81. Found (percent): C, 58.82; H, 3.33; Cl, 10.90; N, 17.46; S, 9.49.

In a subsequent experiment a higher melting polymorph of 8-chloro-6-phenyl-4H-s-triazolo[4,3-a][1,4]benzodiazepine-1-thiol of melting point 255–258° C. was obtained.

EXAMPLE 2

8-nitro-6-phenyl-4H-s-triazolo[4,3-a][1,4]benzodiazepine-1-thiol

In the manner given in Example 1, 7-nitro-5-phenyl-3H-1,4-benzodiazepin-2-yl hydrazine was treated with triethylamine and thiophosgene to give 8-nitro-6-phenyl-4H-s-triazolo[4,3-a][1,4]benzodiazepine-1-thiol.

EXAMPLE 3

8-chloro-6-(o-chlorophenyl)-4H-s-triazolo[4,3-a][1,4]benzodiazepine-1-thiol

In the manner given in Example 1, 7-chloro-5-(o-chlorophenyl)-3H-1,4-benzodiazepin-2-yl hydrazine was treated with triethylamine and thiophosgene to give 8-chloro-6-(o-chlorophenyl)-4H-s-triazolo[4,3-a][1,4]benzodiazepine-1-thiol.

EXAMPLE 4

8-chloro-6-(2,6-difluorophenyl)-4H-s-triazolo[4,3-a][1,4]benzodiazepine-1-thiol

In the manner given in Example 1, 7-chloro-5-chloro-5-(2,6-difluorophenyl)-3H-1,4-benzodiazepin-2-yl hydrazine was treated with triethylamine and thiophosgene to give 8-chloro-6-(2,6-difluorophenyl)-4H-s-triazolo[4,3-a][1,4]-benzodiazepine-1-thiol.

EXAMPLE 5

6-(o-chlorophenyl)-4H-s-triazolo[4,3-a][1,4]benzodiazepine-1-thiol

In the manner given in Example 1, 5-(o-chlorophenyl)-3H-1,4-benzodiazepin-2-yl hydrazine was treated with triethylamine and thiophosgene to give 6-(o-chlorophenyl)-4H-s-triazolo[4,3-a][1,4]benzodiazepine-1-thiol.

EXAMPLE 6

8-methylsulfinyl-6-phenyl-4H-s-triazolo[4,3-a][1,4]benzodiazepine-1-thiol

In the manner given in Example 1, 7-methylsulfinyl-5-phenyl-3H-1,4-benzodiazepin-2-yl hydrazine was treated with triethylamine and thiophosgene to give 8-methylsulfinyl-6-phenyl-4H-s-triazolo[4,3-a][1,4]benzodiazepine-1-thiol.

EXAMPLE 7

8,9-dicyano-6-(p-isopropylphenyl)-4H-s-triazolo[4,3-a][1,4]benzodiazepine-1-thiol In the manner given in Example 1, 7,8-dicyano-5-(p-isopropylphenyl)-3H-1,4-benzodiazepin-2-yl hydrazine was treated with triethylamine and thiophosgene to give 8,9-dicyano-6-(p-isopropylphenyl)-4H-s-triazolo[4,3-a][1,4]benzodiazepine-1-thiol.

EXAMPLE 8

4,7,9-trimethyl-6-(o-chlorophenyl)-4H-s-triazolo[4,3-a][1,4]benzodiazepine-1-thiol In the manner given in Example 1, 3,6,8-trimethyl-5-(o-chlorophenyl)-3H-1,4-benzodiazepin-2-yl hydrazine was treated with triethylamine and thiophosgene to give 4,7,9-trimethyl-6-(o-chlorophenyl)-4H-s-triazolo[4,3-a][1,4]benzodiazepine-1-thiol.

EXAMPLE 9

7,9-diethyl-6-(m-ethylphenyl)-4H-s-triazolo[4,3-a][1,4]benzodiazepine-1-thiol

In the manner given in Example 1, 6,8-diethyl-5-(m-ethylphenyl)-3H-1,4-benzodiazepin-2-yl hydrazine was treated with triethylamine and thiophosgene to give 7,9-diethyl-6-(m-ethylphenyl)-4H-s-triazolo[4,3-a][1,4]benzodiazepine-1-thiol.

EXAMPLE 10

10-propylsulfonyl-8-methyl-6-phenyl-4H-s-triazolo[4,3-a][1,4]benzodiazepine-1-thiol In the manner given in Example 1, 9-propylsulfonyl-7-methyl-5-phenyl-3H-1,4-benzodiazepin-2-yl hydrazine was treated with triethylamine and thiophosgene to give 10-propylsulfonyl-8-methyl-6-phenyl-4H-s-triazolo[4,3-a][1,4]benzodiazepine-1-thiol.

EXAMPLE 11

8-chloro-1-(methylthio)-6-phenyl-4H-s-triazolo[4,3-a][1,4]benzodiazepine

A stirred suspension of 8-chloro-6-phenyl-4H-s-triazolo[4,3-a][1,4]benzodiazepine-1-thiol (1.54 g., 0.00471 mole) in 1.5 N sodium hydroxide (94 ml.) was treated with methyl iodide (70.8 ml.) and kept at ambient temperature for 25 minutes. This mixture was extracted with methylene chloride. The extract was dried over anhydrous sodium sulfate and concentrated in vacuo. The residue was crystallized from ethyl acetate to give 0.54 g., melting point 220–223° C. and 0.56 g., melting point 219–220.5° C. (68.8% yield) of 8 - chloro-1-(methylthio)-6-phenyl-4H - s - triazolo[4,3-a][1,4]benzodiazepine. The analytical sample had a melting point of 220–221° C.

*Analysis.*—Calcd. for $C_{17}H_{13}ClN_4S$ (percent): C, 59.90; H, 3.84; Cl, 10.40; N, 16.44; S, 9.41. Found (percent): C, 59.89; H, 4.20; Cl, 10.43; N, 16.22; S, 9.03.

EXAMPLE 12

8-nitro-1-(propylthio)-6-phenyl-4H-s-triazolo-[4,3-a][1,4]benzodiazepine

In the manner given in Example 11, a suspension of 8-nitro-6 - phenyl-4H-s-triazolo[4,3-a][1,4]benzodiazepine-1-thiol in sodium hydroxide was reacted with propyl iodide to give 8 - nitro-1-(propylthio)-6-phenyl-4H-s-triazolo[4,3-a][1,4]benzodiazepine.

EXAMPLE 13

8-chloro-1-(ethylthio)-6-(o-chlorophenyl)-4H-s-triazolo[4,3-a][1,4]benzodiazepine In the manner given in Example 11, a suspension of 8-chloro - 6 - (o-chlorophenyl)-4H-s-triazolo[4,3-a][1,4]-benzodiazepine-1-thiol in sodium hydroxide was reacted with ethyl bromide to give 8-chloro-1-(ethylthio)-6-(o-chlorophenyl) - 4H-s-triazolo[4,3-a][1,4]benzodiazepine.

EXAMPLE 14

8-chloro-1-(methylthio-6-(2,6-difluorophenyl)-4H-s-triazolo[4,3-a][1,4]benzodiazepine In the manner given in Example 11, a suspension of 8-chloro-6-(2,6 - difluorophenyl)-4H-s-triazolo[4,3-a][1,4]-benzo-diazepine-1-thiol in potassium hydroxide was reacted with methyl bromide to give 8-chloro-1-(methylthio)-6-(2,6 - difluorophenyl)-4H-s-triazolo[4,3-a][1,4]-benzodiazepine.

EXAMPLE 15

1-(isopropylthio)-6-(o-chlorophenyl)-4H-s-triazolo[4,3-a][1,4]benzodiazepine

In the manner given in Example 11, a suspension of 6-(o-chlorophenyl) - 4H - s-triazolo[4,3-a][1,4]benzodiazepine-1-thiol in sodium hydroxide was reacted with isopropyl iodide to give 1-(isopropylthio)-6-(o-chlorophenyl)-4H-s-triazolo[4,3-a][1,4]benzodiazepine.

EXAMPLE 16

8-methylsulfinyl-1-(ethylthio)-6-phenyl-4H-s-triazolo[4,3-a][1,4]benzodiazepine

In the manner given in Example 11, a suspension of 8-methylsulfinyl - 6-phenyl-4H-s-triazolo[4,3-a][1,4]benzodiazepine-1-thiol in potassium hydroxide was reacted with ethyl bromide to give 8 - methylsulfinyl-1-(ethylthio)-6-phenyl-4H-s-triazolo[4,3-a][1,4]benzodiazepine.

EXAMPLE 17

8,9-dicyano-1-(propylthio)-6-(isopropylphenyl)-4H-s-triazolo[4,3-a][1,4]benzodiazepine In the manner given in Example 11, a suspension of 8,9-dicyano-6-(isopropylphenyl) - 4H - s - triazolo[4,3][1,4]benzodiazepine-1-thiol in potassium hydroxide was reacted with propyl chloride to give 8,9-dicyano-1-(propylthio) - 6 - (isopropylphenyl)-4H-s-triazolo[4,3-a][1,4]benzodiazepine.

EXAMPLE 18

4,7,9-trimethyl-1-(methylthio)-6-(o-chloro-phenyl)-4H-s-triazolo[4,3-a][1,4]benzodiazepine In the manner given in Example 11, a suspension of 4,7,9 - trimethyl-6-(o-chlorophenyl)-4H-s-triazolo[4,3-a][1,4]benzodiazepine-1-thiol in sodium hydroxide was reacted with methyl iodide to give 4,7,9-trimethyl-1-(methylthio)-6-(o-chlorophenyl) - 4H - s - triazolo[4,3-a][1,4] benzodiazepine.

EXAMPLE 19

7,9-diethyl-1-(ethylthio)-6-(m-ethylphenyl)-4H-s-triazolo[4,3-a][1,4]benzodiazepine In the manner given in Example 11, a suspension of 7,9-diethyl-6-(m - ethylphenyl)-4H-s-triazolo[4,3-a][1,4] benzodiazepin-1-thiol in sodium hydroxide was reacted with ethyl iodide to give 7,9-diethyl-1-(ethylthio)-6-(m-ethylphenyl)-4H-s-triazolo[4,3-a][1,4]benzodiazepine.

EXAMPLE 20

10-propylsulfonyl-8-methyl-1-(propylthio)-6-phenyl-4H-s-triazolo[4,3-a][1,4]benzodiazepine In the manner given in Example 11, a suspension of 10-propylsulfonyl-8-methyl-6-phenyl - 4H - s - triazolo-[4,3-a][1,4]benzodiazepine-1-thiol in sodium hydroxide was reacted with propyl iodide to give 10-propylsulfonyl-8-methyl-1-(propylthio) - 6 - phenyl-4H-s-triazolo[4,3-a][1,4]benzodiazepine.

EXAMPLE 21

1-amino-8-chloro-6-phenyl-4H-s-triazolo-[4,3-a][1,4]benzodiazepine

A stirred mixture of 7-chloro-5-phenyl-3H-1,4-benzodiazepin-2-yl hydrazine (2.85 g., 0.01 mole) and dioxane (25 ml.) was cooled in an ice bath and treated with a solution of sodium carbonate (1.06 g., 0.01 mole) in water (6 ml.). A solution of cyanogen bromide (1.06 g., 0.01 mole) in dioxane (10 ml.) was added to this mixture during 5 minutes, keeping the temperature of the mixture at 3–4°. The mixture was allowed to warm to ambient temperature during 20 minutes and was kept at this temperature for 3 hours 45 minutes. It was then poured into ice water. The solid was collected by filtration, washed with water, dried and recrystallized from methanol to give 2.08 g. of 1-amino-8-chloro-6-phenyl-4H-s-triazolo[4,3-a][1,4]benzodiazepine of melting point 311–312°. The analytical sample was crystallized from methylene chloride-methanol and had a melting point of 280° C.

*Analysis.*—Calcd. for $C_{16}H_{12}ClN_5$ (percent): C, 62.04; H, 3.91; Cl, 11.45; N, 22.61. Found (percent): C, 62.15; H, 3.89; Cl, 11.73; N, 22.79.

EXAMPLE 22

1-amino-8-nitro-6-phenyl-4H-s-triazolo-[4,3-a][1,4]benzodiazepine

In the manner given in Example 21, 7-nitro-5-phenyl 3H-1,4-benzodiazepine-2-yl hydrazine in an aqueous dioxane solution of sodium carbonate was treated with cyanogen bromide in dioxane at 3–5° C. and then at room temperature to give 1-amino-8-nitro-6-phenyl-4H-s-triazolo[4,3-a][1,4]benzodiazepine.

EXAMPLE 23

1-amino-8-chloro-6-(o-chlorophenyl)-4H-s-triazolo[4,3-a][1,4]benzodiazepine

In the manner given in Example 21, 7-chloro-5-(o-chlorophenyl) - 3H - 1,4-benzodiazepin-2-yl hydrazine in an aqueous dioxane solution of sodium carbonate was treated with cyanogen bromide in dioxane at 3–5° C. and at room temperature to give 1-amino-8-chloro-6-(o-chlorophenyl)-4H-s-triazolo[4,3-a][1,4]benzodiazepine.

EXAMPLE 24

1-amino-8-chloro-6-(2,6-difluorophenyl)-4H-s-triazolo[4,3-a][1,4]benzodiazepine

In the manner given in Example 21, 7-chloro-5-(2,6-difluorophenyl)-3H-1,4-benzodiazepin-2-yl hydrazine in an aqueous dioxane solution of potassium carbonate was treated with cyanogen bromide in dioxane at 3–5° C. and then at room tmeperature to give 1-amino-8-chloro-6-(2,6 - difluorophenyl)-4H-s-triazolo[4,3 - a][1,4]benzodiazepine.

EXAMPLE 25

1-amino-6-(o-chlorophenyl)-4H-s-triazolo-
[4,3-a][1,4]benzodiazepine

In the manner given in Example 21, 5-(o-chlorophenyl)-3H-1,4-benzodiazepin-2-yl hydrazine in an aqueous dioxane solution of sodium carbonate was treated with cyanogen bromide in dioxane at 3–5° C. and then at room temperature to give 1-amino-6-(o-chlorophenyl)-4H-s-triazolo[4,3-a][1,4]benzodiazepine.

EXAMPLE 26

1-amino-8-methylsulfinyl-6-phenyl-4H-s-triazolo[4,3-a][1,4]benzodiazepine

In the manner given in Example 21, 7-methylsulfinyl-5-phenyl-3H-1,4-benzodiazepin-2-yl hydrazine in an aqueous dioxane solution of sodium carbonate was treated with cyanogen bromide in dioxane at 3–5° C. and then at room temperature to give 1-amino-8-methylsulfinyl-6-phenyl-4H-s-triazolo[4,3-a][1,4]benzodiazepine.

EXAMPLE 27

1-amino-8,9-dicyano-6-(p-isopropylphenyl)-4H-s-triazolo[4,3-a][1,4]benzodiazepine In the manner given in Example 21, 7,8-dicyano-5-(p-isopropylphenyl)-3H-1,4-benzodiazepin-2-yl hydrazine in an aqueous dioxane solution of potassium carbonate was treated with cyanogen bromide in dioxane at 3–5° C. and then at room temperature to give 1-amino-8,9-dicyano-6-(p-isopropylphenyl)-4H-s-triazolo[4,3-a][1,4]benzodiazepine.

EXAMPLE 28

1-amino-8-methoxy-6-(p-propoxyphenyl)-4H-s-triazolo[4,3-a][1,4]benzodiazepine

In the manner given in Example 21, 7-methoxy-5-(p-propoxyphenyl)-3H-1,4-benzodiazepin-2-yl hydrazine in an aqueous dioxane solution of sodium carbonate was treated with cyanogen bromide in dioxane at 3–5° C. and then at room temperature to give 1-amino-8-methoxy-6-(p-propoxyphenyl)-4H-s-triazolo[4,3-a][1,4]benzodiazepine.

EXAMPLE 29

1-amino-10-propylsulfonyl-8-methyl-6-phenyl-4H-s-triazolo[4,3-a][1,4]benzodiazepine In the manner given in Example 21, 9-propylsulfonyl-7-metyhl-5-phenyl-3H-1,4-benzodiazepine-2-yl hydrazine in an aqueous dioxane solution of sodium carbonate was treated with a cyanogen bromide in dioxane at 3–5° C. and then at room temperature to give 1-amino-10-propylsulfonyl-8-methyl-6-phenyl-4H-s-triazolo[4,3-a][1,4]benzodiazepine.

EXAMPLE 30

1-amino-7,9-diethyl-6-(m-ethylphenyl)-4H-s-triazolo[4,3-a][1,4]benzodiazepine

In the manner given in Example 21, 6,8-diethyl-5-(m-ethylphenyl)-3H-1,4-benzodiazepin-2-yl hydrazine in an aqueous dioxane dioxane solution of sodium carbonate was treated with cyanogen bromide in dioxane at 3–5° C. and then at room temperature to give 1-amino-7,9-diethyl-6-(m-ethylphenyl)-4H-s-triazolo[4,3-a][1,4]benzodiazepine.

EXAMPLE 31

8-chloro-1-nitro-6-phenyl-4H-s-triazolo[4,3-a]-[1,4]benzodiazepine

A solution of 1-amino-8-chloro-6-phenyl-4H-s-triazolo-[4,3-a][1,4]benzodiazepine (3.1 g., 0.01 mole) in methylene chloride (20 ml.) was added during 30 minutes to a solution of peroxtrifluoroacetic acid [prepared from 90% hydrogen peroxide (0.04 M) and trifluoroacetic anhydride (0.041 M)] in 25 ml. of methylene chloride. The mixture was allowed to reflux for 1 hour, cooled and poured into cold water. This mixture was neutralized with aqueous sodium carbonate and extracted with methylene chloride. The extracts were dried over anhydrous potassium carbonate and concentrated. The resulting residue was crystallized from ethyl acetate-Skellysolve B hexanes to give pure 8-chloro-1-nitro-6-phenyl - 4H - s - triazolo[4,3-a][1,4]benzodiazepine.

EXAMPLE 32

1,8-dinitro-6-(o-chlorophenyl)-4H-s-triazolo-[4,3-a][1,4]benzodiazepine

In the manner given in Example 31, 1-amino-8-nitro-6-(o-chlorophenyl) - 4H - s - triazolo[4,3-a][1,4]benzodiazepine in methylene chloride was oxidized with peroxytrifluoroacetic acid to give 1,8-dinitro-6-(o-chlorophenyl)-4H-s-triazolo[4,3-a][1,4]benzodiazepine.

EXAMPLE 33

8-chloro-1-nitro-6-(o-chlorophenyl)-4H-s-triazolo[4,3-a[1,4]benzodiazepine

In the manner given in Example 1, 1-amino-8-chloro-6-(o-chlorophenyl) - 4H - s - triazolo[4,3-a][1,4]benzodiazepine in methylene chloride was oxidized with peroxytrifluoroacetic acid to give 8-chloro-1-nitro-6-(o-chlorophenyl)-4H-s-triazolo[4,3-a][1,4]benzodiazepine.

EXAMPLE 34

8-chloro-1-nitro-6-(2,6-difluorophenyl)-4H-s-triazolo[4,3-a][1,4]benzodiazepine

In the manner given in Example 31, 1-amino-8-chloro-6-(2,6-difluorophenyl-4H - s - triazolo[4,3-a][1,4]benzodiazepine in methylene chloride was oxidized with peroxytrifluoroacetic acid to give 8-chloro-1-nitro-6-(2,6-difluorophenyl)-4H-s-triazolo[4,3-a][1,4]benzodiazepine.

EXAMPLE 35

1-nitro-6-(o-chlorophenyl)-4H-s-triazolo[4,3-a][1,4]benzodiazepine

In the manner given in Example 31, 1-amino-6-(o-chlorophenyl)-4H-s-triazolo[4,3-a][1,4]benzodiazepine in methylene chloride was oxidized with peroxytrifluoroacetic acid to give 1-nitro-6-(o-chlorophenyl)-4H-s-triazolo[4,3-a][1,4]benzodiazepine.

EXAMPLE 36

8,9-dicyano-1-nitro-6-(p-isopropylphenyl)-4H-s-triazolo[4,3-a][1,4]benzodiazepine In the manner given in Example 31, 1-amino-8,9-dicyano-6-(p-isopropylphenyl) - 4H - s - triazolo[4,3-a][1,4]benzodiazepine in methylene chloride was oxidized with peroxytrifluoroacetic acid to give 8,9-dicyano-1-nitro-6-(p-isopropylphenyl) - 4H - s -triazolo[4,3-a][1,4]benzodiazepine.

EXAMPLE 37

8-chloro-1-fluoro-6-phenyl-4H-s-triazolo[4,3-a][1,4]benzodiazepine

An ice cold solution of 1-amino-8-chloro-6-phenyl-4H-s-triazolo[4,3-a][1,4]benzodiazepine (3.1 g., 0.01 mole) in 13 ml. of 40% fluoboric acid was treated slowly with 0.69 g. of sodiumnitrite at such a rate that the temperature stayed below 10° C. The mixture was kept at 40° C. for one hour and was then warmed slowly to 37° C. The mixture was then neutralized with sodium carbonate and extracted with chloroform; the extracts were dried over anhydrous potassium carbonate, and concentrated to dryness. The resulting residue was crystallized from ethyl acetate to give pure 8-chloro-1-fluoro-6-phenyl-4H-s-triazolo[4,3a][1,4]benzodiazepine.

EXAMPLE 38

8-nitro-1-fluoro-6-phenyl-4H-s-triazolo[4,3-a]-[1,4]benzodiazepine

In the manner given in Example 37, 1-amino-8-nitro-6 - phenyl-4H-s-triazolo[4,3-a][1,4]benzodiazepine, dissolved in fluoboric acid, was treated at about 5° C. with sodium nitrite, then warmed to decompose the diazonium intermediate, and to thus give 8-nitro-1-fluoro-phenyl-4-H-triazolo[4,3-a][1,4]benzodiazepine.

EXAMPLE 39

8-chloro-1-fluoro-6-(o-chlorophenyl)-4H-s-triazolo[4,3-a][1,4]benzodiazepine

In the manner given in Example 37, 1-amino-8-chloro-6-(o-chlorophenyl)-4H - s - triazolo[4,3-a][1,4]benzodiazepine, dissolved in fluoboric acid, was treated at about 5° C. with sodium nitrite, then warmed to decompose the diazonium intermediate, and to thus give 8-chloro-1-fluoro-6-(o-chlorophenyl) - 4H - s - triazolo[4,3-a][1,4] benzodiazepine.

EXAMPLE 40

8-chloro-1-fluoro-6-(2,6-difluorophenyl)-4H-s-triazolo[4,3-a][1,4]benzodiazepine In the manner given in Example 37, 1-amino-8-chloro-6-(2,6-difluorophenyl) - 4H - s - triazolo[4,3-a][1,4]benzodiazepine, dissolved in fluoboric acid, was treated at about 5° C. with sodium nitrile, then warmed to decompose the diazonium intermediate, and to this give 8-chloro-1-fluoro-6-(2,6-difluorophenyl) - 4H - s - triazolo[4,3-a][1,4]benzodiazepine.

EXAMPLE 41

1-fluoro-6-(o-chlorophenyl)-4H-s-triazolo[4,3-a][1,4]benzodiazepine

In the manner given in Example 37, 1-amino-6-(o-chlorophenyl)-4H-s-triazolo[4,3 - a][1,4]benzodiazepine dissolved in fluoboric acid, was treated at about 5° C. with sodium nitrite, then warmed to decompose the diazonium intermediate, and to thus give 1 - fluoro-6-(o-chlorophenyl)-4H-s-triazolo[4,3-a][1,4]benzodiazepine.

EXAMPLE 42

7,9-diethyl-1-fluoro-6-(m-ethylphenyl)-4H-s-triazolo[4,3-a][1,4]benzodiazepine

In the manner given in Example 37, 1-amino-7,9-diethyl - 6 - (m-ethylphenyl)-4H-s-triazolo[4,3-a][1,4]benzodiazepine, dissolved in fluoboric acid, was treated at about 5° C. with sodium nitrite, then warmed to decompose the diazonium intermediate, and to thus give 7,9-diethyl - 1 - fluoro-6-(m-ethylphenyl)-4H-s-triazolo[4,3-a][1,4]benzodiazepine.

In the manner given in the preceding examples other 1 - substituted-6-phenyl-4H-s-triazolo[4,3-a][1,4]benzodiazepines of the Formula VII can be produced. Representative compounds, thus obtained, include:

8-(methylsulfinyl)-1-fluoro-6-(o-nitrophenyl)-4H-s-triazolo[4,3-a][1,4]benzodiazepine;
7-(ethylsulfonyl)-1-nitro-6-(o-cyanophenyl)-4H-s-triazolo[4,3-a][1,4]benzodiazepine;
4-propyl-6-[m-(methylthio)phenyl]-4H-s-triazolo[4,3-a][1,4]benzodiazepine-1-thiol;
10-fluoro-7-chloro-1-(ethylthio)-6-[p-trifluoromethyl)-phenyl]-4H-s-triazolo[4,3-a][1,4]benzodiazepine;
7,9-diethoxy-1-(methylthio)-6-(m-ethoxyphenyl)-4H-s-triazolo[4,3-a][1,4]benzodiazepine;
7-(propylthio)-6-(m-iodophenyl)-4H-s-triazolo[4,3-a][1,4]benzodiazepine-1-thiol;
8-methylsulfinyl)-1-nitro-6-(o-nitrophenyl)-4H-s-triazolo[4,3-a][1,4]benzodiazepine;
7-(ethylsulfonyl)-1-fluoro-6-(o-cyanophenyl)-4H-s-triazolo[4,3-a][1,4]benzodiazepine;
4-propyl-1-(isopropylthio)-6-[m-(methylthio)phenyl]-4H-s-triazolo[4,3-a][1,4]benzodiazepine;
1,10-difluoro-7-chloro-6-[p-(trifluoromethyl)phenyl]-4H-s-triazolo[4,3-a][1,4]benzodiazepine;
7-(propylthio)-1-fluoro-6-(m-iodophenyl)-4H-s-triazolo[4,3-a][1,4]benzodiazepine;
4-propyl-1-(propylthio)-6-(o-iodophenyl)-4H-s-triazolo[4,3-a][1,4]benzodiazepine;
4-ethyl-1-methylthio-6-[o-(ethylthio)phenyl]-4H-s-triazolo[4,3-a][1,4]benzodiazepine;
4-methyl-1-fluoro-7,10-dichloro-6-(m-isopropoxyphenyl)-4H-s-triazolo[4,3-a][1,4]benzodiazepine;
4-isopropyl-1-fluoro-7,9-diiodo-6-phenyl-4H-s-triazolo[4,3-a][1,4]benzodiazepine;
8-chloro-1-nitro-6-,3,4-dimethylphenyl)-4H-s-triazolo[4,3-a][1,4]benzodiazepine;
1-nitro-6-(-2-methyl-4-methoxyphenyl)-4H-s-triazolo[4,3-a][1,4]benzodiazepine;
8-methylthio-1-methylthio-6-phenyl-4H-s-triazolo[4,3-a][1,4]benzodiazepine;
8-methoxy-1-fluoro-6-phenyl-4H-s-triazolo[4,3-a][1,4]benzodiazepine;
and the like.

I claim:
1. A 1-substituted-6-phenyl-4H-s-triazolo[4,3-a][1,4]benzodiazepine of the Formula VII:

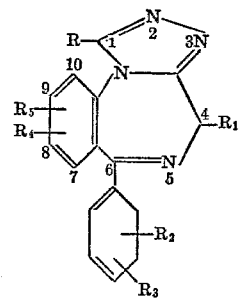

(VII)

wherein R is selected from the group consisting of thio, alkylthio, in which the alkyl group is of 1 to 3 carbon atoms, inclusive, amino, nitro, and fluoro; wherein $R_1$ is selected from the group consisting of hydrogen and alkyl defined as above, and wherein $R_2$, $R_3$, $R_4$, and $R_5$ are selected from the group consisting of hydrogen, alkyl, defined as above, halogen, nitro, cyano, trifluoromethyl, and alkoxy, alkylthio, alkylsulfinyl, and alkylsulfonyl, in which the carbon chain moieties are of 1 to 3 carbon atoms, inclusive, and their pharmacologically acceptable acid addition salts.

2. A compound according to claim 1 of the formula:

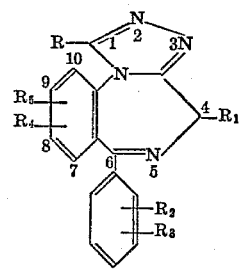

wherein R is selected from the group consisting of thio and alkylthio in which the alkyl group is of 1 to 3 carbon atoms, inclusive, wherein $R_1$ is selected from the group consisting of hydrogen and alkyl, defined as above; and wherein $R_2$, $R_3$, $R_4$, and $R_5$ are selected from the group consisting of hydrogen, alkyl, defined as above, halogen, nitro, cyano, trifluoromethyl, and alkoxy, alkylthio, alkylsulfinyl, alkylsulfonyl, in which the carbon chain moieties are of 1 to 3 carbon atoms, inclusive, and their pharmacologically acceptable acid addition salts.

3. The compound of claim 2 wherein R is thio, $R_1$, $R_2$, $R_3$, and $R_5$ are hydrogen and $R_4$ is 8-chloro and the compound is therefore 8-chloro-6-phenyl-4H-s-triazolo[4,3-a]-[1,4]benzodiazepine-1-thiol.

4. The compound of claim 2 wherein R is methylthio, $R_1$, $R_2$, $R_3$, and $R_5$ are hydrogen, and $R_4$ is 8-chloro and the compound is therefore 8-chloro-1-methylthio-6-phenyl-4H-s-triazolo[4,3-a][1,4]benzodiazepine.

5. A compound according to claim 1 of the formula:

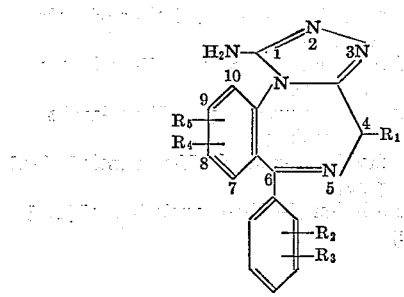

wherein $R_1$ is selected from the group consisting of hydrogen and alkyl of 1 to 3 carbon atoms, inclusive; and wherein $R_2$, $R_3$, $R_4$, and $R_5$ are selected from the group consisting of hydrogen, alkyl, defined as above, halogen, nitro, cyano, trifluoromethyl, and alkoxy, alkylthio, alkylsulfinyl, alkylsulfonyl, in which the carbon chain moieties are of 1 to 3 carbon atoms, inclusive, and their pharmacologically acceptable acid addition salts.

6. The compound of claim 5 wherein $R_1$, $R_2$, $R_3$, and $R_5$ are hydrogen and $R_4$ is 8-chloro and the compound is therefore 8-chloro-1-amino-6-phenyl-4H-s-triazolo[4,3-a]-[1,4]benzodiazepine.

7. A 1-substituted-4H-s-triazolo[4,3-a][1,4]benzodiazepine according to claim 1 wherein R is fluoro.

8. A compound according to claim 7 wherein R is fluoro, $R_1$, $R_2$, $R_3$, and $R_5$ are hydrogen, $R_4$ is 8-chloro, and the compound is therefore 8-chloro-1-fluoro-6-phenyl-4H-s-triazolo[4,3-a][1,4]benzodiazepine.

9. A 1-nitro-6-phenyl-4H-s-triazolo[4,3-a][1,4]benzodiazepine of the formula:

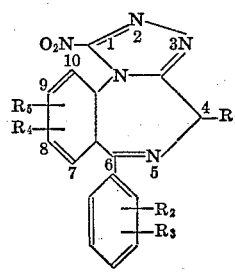

wherein $R_1$ is selected from the group consisting of hydrogen and alkyl, defined as above, and wherein $R_2$, $R_3$, $R_4$, and $R_5$ are selected from the group consisting of hydrogen, alkyl, defined as above, halogen, nitro, cyano, trifluoromethyl, and alkoxy, alkylthio, alkylsulfinyl, and alkylsulfonyl, in which the carbon chain moieties are of 1 to 3 carbon atoms, inclusive, and their pharmacologically acceptable acid addition salts.

10. A compound according to claim 9 wherein $R_1$, $R_2$, $R_3$, and $R_5$ are hydrogen, $R_4$ is chloro and the compound is therefore 8-chloro-1-nitro-6-phenyl-4H-s-triazolo[4,3-a][1,4]-benzodiazepine.

11. A process for the preparation of a compound of the formula:

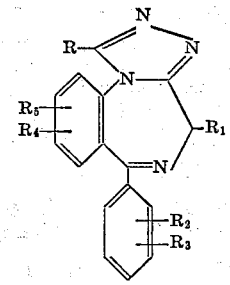

wherein R is thio, wherein $R_1$ is selected from the group consisting of hydrogen and alkyl of 1 to 3 carbon atoms, inclusive, and wherein $R_2$, $R_3$, $R_4$, and $R_5$ are selected from the group consisting of hydrogen, alkyl defined as above, halogen, nitro, cyano, trifluoromethyl, and alkoxy, alkylthio, alkylsulfinyl, alkylsulfonyl, in which the carbon chain moieties are of 1 to 3 carbon atoms, inclusive, which comprises: treating a hydrazine, compound of Formula I;

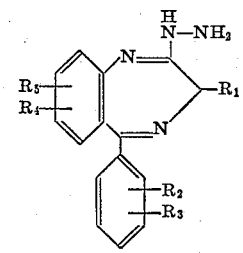

(1)

wherein $R_1$, $R_2$, $R_3$, $R_4$, and $R_5$ are defined as above, in an inert organic solvent with thiophosgene and an organic base at −20 to 5° C., then heating the reaction mixture between room temperature and 100° C. to give the thio compound of the formula above.

12. The process of claim 11 wherein the organic base is triethylamine.

13. The process according to claim 11 wherein in the starting material $R_1$, $R_2$, $R_3$, and $R_5$ are hydrogen and $R_4$ is chloro.

14. A process for the preparation of a compound of the formula:

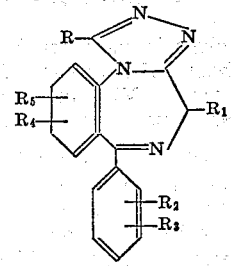

(VII)

wherein R is alkylthio in which the alkyl group is of 1 to 3 carbon atoms, inclusive, wherein $R_1$ is selected from the group consisting of hydrogen and alkyl, defined as above; and wherein $R_2$, $R_3$, $R_4$, and $R_5$ are selected from the group consisting of hydrogen, alkyl, defined as above, halogen, nitro, cyano, trifluoromethyl, and alkoxy, alkylthio, alkylsulfinyl, alkylsulfonyl in which the carbon chain moieties are of 1 to 3 carbon atoms, inclusive, which comprises: treating a hydrazine compound of Formula I;

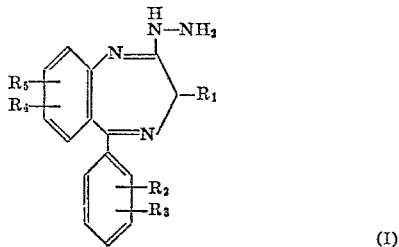

wherein $R_1$, $R_2$, $R_3$, $R_4$, and $R_5$ are defined as above, in an inert organic solvent, with thiophosgene and an organic base at −20 to 5° C., then heating the reaction mixture between room temperature and 100° C., to give the corresponding thiol compound treating the resulting thiol at between 20–50° C. with aqueous sodium or potassium hydroxide and then an alkyl halide R'X, in which R' is alkyl of 1 to 3 carbon atoms, inclusive, and X is chlorine, bromine, or iodine, to give the compound VII of the formula above.

15. A process for the production of a 1-amino-6-phenyl-4H-s-triazolo[4,3 - a][1,4]benzodiazepine, by treating an aqueous dioxane solution of sodium bicarbonate and a 5-phenyl-3H-1,4-benzodiazepin-2-yl hydrazine of the Formula I:

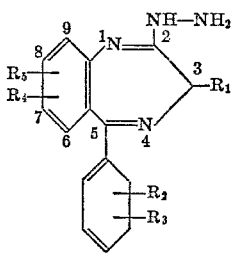

(1)

wherein $R_1$ is selected from the group consisting of hydrogen and alkyl of 1 to 3 carbon atoms, inclusive, and wherein $R_2$, $R_3$, $R_4$, and $R_5$ are selected from the group consisting of hydrogen, alkyl as defined above, halogen, nitro, cyano, trifluoromethyl, and alkoxy, alkylthio, alkylsulfinyl, and alkylsulfonyl in which the carbon chain moieties are of 1 to 3 carbon atoms, inclusive, with cyanogen bromide in a water-miscible, inert, organic solvent at 0–5° C.; then allowing the mixture to warm up to room temperature to obtain the corresponding 1-amino-6-phenyl-4H-s-triazolo[4,3-a][1,4]benzodiazepine.

16. The process of claim 15 wherein the starting material is 7-chloro-5-phenyl-3H-1,4-benzodiazepin-2-yl hydrazine.

17. The process of claim 15 wherein the 1-amino-6-phenyl - 4H-s-triazolo[4,3-a][1,4]benzodiazepine is oxidized with peroxytrifluoroacetic acid in an inert organic solvent at 10–60° C. to give the corresponding 1-nitro-6-phenyl-4H-s-triazolo[4,3-a][1,4]benzodiazepine.

18. The process of claim 15 wherein the 1-amino-6-phenyl-4H-s-triazolo[4,3-a][1,4]benzodiazepine is treated at 0° to 10° C. with fluoboric acid and sodium nitrile, then heated to 30–40° C. to give the corresponding 1-fluoro-6-phenyl-4H-s-triazolo[4,3-a][1,4]benzodiazepine.

References Cited
UNITED STATES PATENTS 3,646,055    2/1972    Hester _____ 260—308 C
3,422,091    1/1969    Archer et al. ____ 260—239 BD

OTHER REFERENCES

Meguro et al.: Chemical Abstracts, vol. 75, Abstract No. 98599Y (1971).

ALTON D. ROLLINS, Primary Examiner

U.S. Cl. X.R.

71—92; 260—141, 239 BD, 308 C; 424—269

UNITED STATES PATENT OFFICE
CERTIFICATE OF CORRECTION

Patent No. 3,751,426         Dated  August 7, 1973

Inventor(s)   Jackson B. Hester, Jr.

It is certified that error appears in the above-identified patent and that said Letters Patent are hereby corrected as shown below:

On the cover sheet insert -- the portion of the term of this patent subsequent to Feb. 29, 1989, has been disclaimed. --.

Signed and sealed this 31st day of December 1974.

(SEAL)
Attest:

McCOY M. GIBSON JR.
Attesting Officer

C. MARSHALL DANN
Commissioner of Patents